(12) United States Patent
Syed et al.

(10) Patent No.: US 11,299,104 B1
(45) Date of Patent: Apr. 12, 2022

(54) UNIVERSAL CROSSMEMBER ASSEMBLY FOR A ROOF RACK OF A MOTOR VEHICLE

(71) Applicant: DUS Operating Inc., Auburn Hills, MI (US)

(72) Inventors: Imtiaz Syed, Lake Orion, MI (US); Kenneth E. Keck, II, Clinton Township, MI (US); Nadine Pilsner, Lake Orion, MI (US)

(73) Assignee: DUS Operating Inc., Auburn Hills, MI (US)

( * ) Notice: Subject to any disclaimer, the term of this patent is extended or adjusted under 35 U.S.C. 154(b) by 0 days.

(21) Appl. No.: 17/104,178

(22) Filed: Nov. 25, 2020

(51) Int. Cl.
*B60R 9/045* (2006.01)

(52) U.S. Cl.
CPC .................. *B60R 9/045* (2013.01)

(58) Field of Classification Search
CPC ........... B60R 9/045; B60R 9/04; B60R 9/052; B60R 9/058
USPC ........................................................ 224/321
See application file for complete search history.

(56) References Cited

U.S. PATENT DOCUMENTS

| | | | | |
|---|---|---|---|---|
| 2,436,228 A | * | 2/1948 | Purchase | B60R 9/058 224/314 |
| 2,528,794 A | * | 11/1950 | Seidler | B60R 7/10 224/313 |
| 4,752,022 A | * | 6/1988 | Thulin | B60R 9/045 224/314 |
| 6,105,841 A | | 8/2000 | Aftanas | |
| 6,112,965 A | | 9/2000 | Lundgren | |
| 6,796,471 B2 | | 9/2004 | Aftanas et al. | |
| 6,959,844 B2 | | 11/2005 | Potter et al. | |
| 7,437,852 B2 | | 10/2008 | Dufour et al. | |
| 7,458,490 B2 | * | 12/2008 | Klinkman | B60R 9/045 224/321 |
| 7,469,807 B2 | | 12/2008 | Jeong | |
| 7,721,925 B1 | | 5/2010 | Graffy et al. | |
| 7,765,738 B2 | | 8/2010 | Dufour et al. | |
| 7,802,707 B2 | | 9/2010 | Aftanas | |
| 7,806,306 B2 | | 10/2010 | Aftanas | |
| 8,056,782 B2 | | 11/2011 | Lim et al. | |

(Continued)

FOREIGN PATENT DOCUMENTS

| | | |
|---|---|---|
| EP | 0894672 B1 | 2/2003 |
| EP | 2426013 B1 | 5/2013 |

(Continued)

*Primary Examiner* — Peter N Helvey
(74) *Attorney, Agent, or Firm* — Vivacqua Crane PLLC (57) ABSTRACT

A universal crossmember assembly is provided for a motor vehicle having a roof and first and second rails attached to the roof. The assembly includes a crossbar having first and second ends along an axis. The assembly further includes a first clamp mechanism engaged with the first end for securing the crossbar to the first rail. The assembly further includes a second clamp mechanism engaged with the second end for securing the crossbar to the second rail. Each clamp mechanism includes at least first and second jaws having an associated one of first and second rail gripping surfaces for gripping one of the rails when an actuator is moved to an actuated position. Each clamp mechanism further includes a biasing mechanism capable of urging the first jaw away from the second jaw when the actuator is moved to a non-actuated position.

20 Claims, 9 Drawing Sheets

(56) References Cited

U.S. PATENT DOCUMENTS

| | | |
|---|---|---|
| 8,087,557 B2 | 1/2012 | Larsson et al. |
| 8,302,828 B2 | 11/2012 | Kim et al. |
| 8,393,507 B2 | 3/2013 | Aftanas |
| 8,839,997 B2 | 9/2014 | Lundgren |
| 9,038,874 B2 | 5/2015 | Poulsen et al. |
| 9,085,266 B2 | 7/2015 | Chang |
| 9,132,782 B2 | 9/2015 | Hubbard |
| 9,371,041 B2 | 6/2016 | Almhill et al. |
| 9,409,527 B2 | 8/2016 | Hubbard |
| 9,421,918 B2 | 8/2016 | Lundgren |
| 9,566,913 B2 | 2/2017 | Sarges et al. |
| 9,616,819 B2 * | 4/2017 | Kmita ............ B60R 9/058 |
| 9,643,542 B2 | 5/2017 | Aftanas et al. |
| 9,688,211 B2 | 6/2017 | Schierk et al. |
| 9,718,410 B2 | 8/2017 | Cropley et al. |
| 9,725,045 B2 | 8/2017 | Johansson |
| 9,738,229 B2 | 8/2017 | Sato et al. |
| 9,834,152 B2 * | 12/2017 | Almhill ............ B60R 9/058 |
| 10,059,274 B2 * | 8/2018 | Kmita ............ B60R 9/058 |
| 2010/0084448 A1 * | 4/2010 | Fjelland ............ B60R 9/058 224/322 |
| 2016/0144795 A1 | 5/2016 | Westberg et al. |
| 2016/0332581 A1 | 11/2016 | Almhill et al. |
| 2016/0362062 A1 | 12/2016 | Scott et al. |
| 2017/0080872 A1 | 3/2017 | Schactman et al. |
| 2017/0349107 A1 | 12/2017 | Tough |

FOREIGN PATENT DOCUMENTS

| | | |
|---|---|---|
| EP | 2216204 B1 | 11/2013 |
| EP | 1683679 B1 | 7/2015 |
| EP | 2905178 A1 | 8/2015 |
| EP | 2755864 B1 | 7/2016 |
| EP | 2766226 B1 | 8/2016 |
| EP | 3106351 A1 | 12/2016 |
| EP | 2937578 B1 | 2/2017 |
| EP | 3202622 A1 | 8/2017 |
| EP | 2942237 B1 | 10/2017 |
| EP | 3243702 A1 | 11/2017 |

* cited by examiner

UNIVERSAL CROSSMEMBER ASSEMBLY FOR A ROOF RACK OF A MOTOR VEHICLE

FIELD

The present disclosure relates to roof racks for motor vehicles, and more particularly, to a universal crossmember assembly for attaching to roof rails that are spaced from one another by one of a range of distances, with each rail having one of a range of widths.

BACKGROUND

Modern vehicles have roof racks for increasing the cargo capacity of the vehicles. Non-limiting examples of cargo attached to roof racks can include skis, snowboards, bikes, cargo cages, or cargo containers. The roof rack can include two roof rails and multiple crossbars extending between the rails at fixed positions along the rails. The width of each rail and the distance between the rails can vary among vehicles of different makes, models, or production years. For that reason, each crossbar can have a fixed length and shape for attachment to only the rails on vehicles of specific makes, models, and production years.

In certain circumstances, it may be desirable to adjust the distance between crossbars to support cargo having a corresponding length. However, because the rails may not be parallel with one another, the crossbar may not be long enough to attach to sections of opposing rails that are spaced from one another by a distance longer than the fixed length of the crossbar.

Accordingly, there is a need in the art for a universal crossmember assembly that allows a crossbar to be attached to roof rails having one of a range of widths and spaced from one another by one of a range of distances.

SUMMARY

According to several aspects, a universal crossmember assembly is provided for a motor vehicle having a roof with first and second rails attached to the roof. The rails are spaced from one another by one of a range of distances, and each rail has one of a range of widths. The assembly includes a crossbar having first and second ends along an axis. The assembly further includes a first clamp mechanism engaged with the first end for securing the crossbar to the first rail. The assembly further includes a second clamp mechanism engaged with the second end for securing the crossbar to the second rail. Each clamp mechanism includes at least first and second jaws having an associated one of first and second rail gripping surfaces. Each clamp mechanism further includes an actuator engaged with one or more of the jaws. The actuator is movable between a non-actuated position and an actuated position. Each clamp mechanism further includes a biasing mechanism coupled to one or more of the jaws. The biasing mechanism is capable of urging the first jaw away from the second jaw. The rail gripping surfaces of the first clamp mechanism are capable of moving toward one another to grip the first rail, in response to the associated actuator being disposed in the actuated position. The rail gripping surfaces of the first clamp mechanism are capable of being urged away from one another by the associated biasing mechanism, in response to the associated actuator being disposed in the non-actuated position. Similarly, the rail gripping surfaces of the second clamp mechanism are capable of moving toward one another to grip the second rail, in response to the associated actuator being disposed in the actuated position. The rail gripping surfaces of the second clamp mechanism are capable of being urged away from one another by the associated biasing mechanism, in response to the associated actuator being disposed in the non-actuated position.

In one aspect, the assembly further includes one or more modular pads attached to one or more of the jaws. The modular pads form one or more of the rail gripping surfaces. Each modular pad has one of a range of thicknesses that cooperates with the jaws for gripping one of the range of widths of each rail.

In another aspect, the actuator includes a bolt member having an external threading and a drive collar. The drive collar extends from the bolt member and engages the first jaw or second jaw for moving the jaws toward one another.

In another aspect, one or more of the jaws defines an opening with an internal threading for engaging the external threading of the bolt member, such that rotating the bolt member causes the drive collar to engage the first jaw or the second jaw and move the jaws toward one another.

In another aspect, the bolt member has a shaft, with the drive collar being separate from the shaft and displaceable along the shaft of the bolt member.

In another aspect, the bolt member has a shaft, with the drive collar being an integral portion of the bolt member and disposed in a fixed position on the shaft of the bolt member.

In another aspect, the first jaw includes a bracket frame having a first bracket pivotally attached to the second jaw. The biasing member is coupled to the first bracket for urging a free end of the first bracket away from the second jaw. The bracket frame further includes a second bracket carried on the first bracket, with the modular pad being coupled to the second bracket.

According to several aspects, a universal crossmember assembly is provided for a motor vehicle having a roof and first and second rails attached to the roof. The rails are spaced from one another by one of a range of distances, and each rail has one of a range of widths. The assembly includes a crossbar having first and second ends along an axis. The assembly further includes a first clamp mechanism engaged with the first end of the crossbar for securing the crossbar to the first rail. The assembly further includes a second clamp mechanism engaged with the second end of the crossbar for securing the crossbar to the second rail. Each clamp mechanism includes at least first and second jaws having an associated one of first and second rail gripping surfaces. Each clamp mechanism further includes an actuator engaged with one or more of the jaws. The actuator is movable between a non-actuated position and an actuated position. Each clamp mechanism further includes a biasing mechanism coupled to one or more of the jaws. The biasing mechanism is capable of urging the first jaw away from the second jaw. The gripping surfaces of the first clamp mechanism are capable of moving toward one another to grip the first rail, in response to the associated actuator being disposed in the actuated position. The rail gripping surfaces of the first clamp mechanism are capable of moving away from one another by the biasing mechanism of the first clamp mechanism, in response to the associated actuator being disposed in the non-actuated position. Furthermore, the rail gripping surfaces of the second clamp mechanism are capable of moving toward one another to grip the second rail, in response to the associated actuator being disposed in the actuated position. The rail gripping surfaces of the second clamp mechanism are capable of moving away from one another by the biasing mechanism of the second clamp mechanism, in response to the associated actuator being disposed in the non-actuated position. One or more of the clamp mechanisms is displaceable along the axis of the crossbar, such that the crossbar is capable of mounting to rails that are spaced from one another by one of the range of distances.

In one aspect, the assembly further includes one or more modular pads attached to at least one of the jaws, and the modular pads form the rail gripping surfaces. Each modular pad has one of a range of thicknesses that cooperates with the first and second jaws for gripping one of the range of widths of the first and second rails.

In another aspect, the second jaw of each clamp mechanism is a stanchion that defines a seat for supporting the crossbar, and the stanchion is displaceable along the axis of the crossbar.

In another aspect, the crossbar defines an elongated slot along the axis, and the stanchion defines a hole with an internal threading. The elongated slot of the crossbar and the hole of the stanchion are capable of receiving a threaded fastener for holding the stanchion at a fixed position along the axis of the crossbar.

In another aspect, each clamp mechanism further includes a cover for covering the actuator and a locking mechanism mounted to the cover. The locking mechanism is disposable between a locked state where the locking mechanism attaches the cover to the first jaw or the crossbar and an unlocked state where the cover is removable from the first jaw or the crossbar. Each clamp mechanism further includes a key for moving the locking mechanism between the unlocked and locked states.

In another aspect, the actuator includes a bolt member having an external threading and a drive collar extending from the bolt member. At least one of the jaws defines an opening with an internal threading for engaging the external threading of the bolt member, such that rotating the bolt member causes the drive collar to engage the first jaw or the second jaw and move the jaws toward one another.

In another aspect, the bolt member has a shaft, with the drive collar being separate from the shaft and displaceable along the shaft of the bolt member.

In another aspect, the bolt member has a shaft, with the drive collar being an integral portion of the bolt member and disposed in a fixed position on the shaft of the bolt member.

According to several aspects, a method of operating a universal crossmember assembly is provided for a motor vehicle having roof with first and second rails attached to the roof. The rails are spaced from one another by one of a range of distances, and each rail has one of a range of widths. The assembly includes a crossbar having first and second ends along an axis. The assembly further includes first and second clamp mechanisms engaged with an associated one of the first and second ends. Each clamp mechanism has at least first and second jaws with the rail gripping surfaces. Each clamp mechanism further includes an actuator and a biasing mechanism. The method includes positioning the crossbar on the rails at a predetermined distance from another assembly. The actuator of each clamp mechanism is moved from a non-actuated position to an actuated position. For each clamp mechanism, the first rail gripping surface of the first jaw is moved toward the second rail gripping surface of the second jaw, in response to the actuator being disposed in the actuated position. The rail gripping surfaces of the first clamp mechanism grip the first rail, in response to the actuator of the first clamp mechanism being moved to the actuated position. The rail gripping surfaces of the second clamp mechanism grip the second rail, in response to the actuator of the second clamp mechanism being moved to the actuated position. The biasing mechanism of the first clamp mechanism urges the first jaw away from the second jaw, in response to the actuator being disposed in the non-actuated position. The biasing mechanism of the second clamp mechanism urges the first jaw away from the second jaw, in response to the actuator being disposed in the non-actuated position.

In one aspect, the modular pad has one of a range of thicknesses and grips one or more of the rails.

In another aspect, one or more of the clamp mechanisms is displaced along an axis of the crossbar, such that the clamp mechanisms are spaced from one another by a common distance that the rails are also spaced from one another.

In another aspect, a drive collar is displaced along a shaft of a bolt member for the associated actuator.

In another aspect, the actuator of the first clamp mechanism is covered by attaching a cover of the first clamp mechanism to the crossbar or the associated first jaw. The actuator of the second clamp mechanism is covered by attaching a cover of the second clamp mechanism to the crossbar or the associated first jaw. A key moves a locking mechanism of an associated one of the clamp mechanisms between an unlocked state and a locked state. The cover is removed from one or more of the clamp mechanisms, in response to the locking mechanism being disposed in the unlocked state. The cover is secured to one or more of the clamp mechanisms, in response to the locking mechanism being disposed in the locked state.

Further areas of applicability will become apparent from the description provided herein. It should be understood that the description and specific examples are intended for purposes of illustration only and are not intended to limit the scope of the present disclosure.

DETAILED DESCRIPTION

Figure 1:
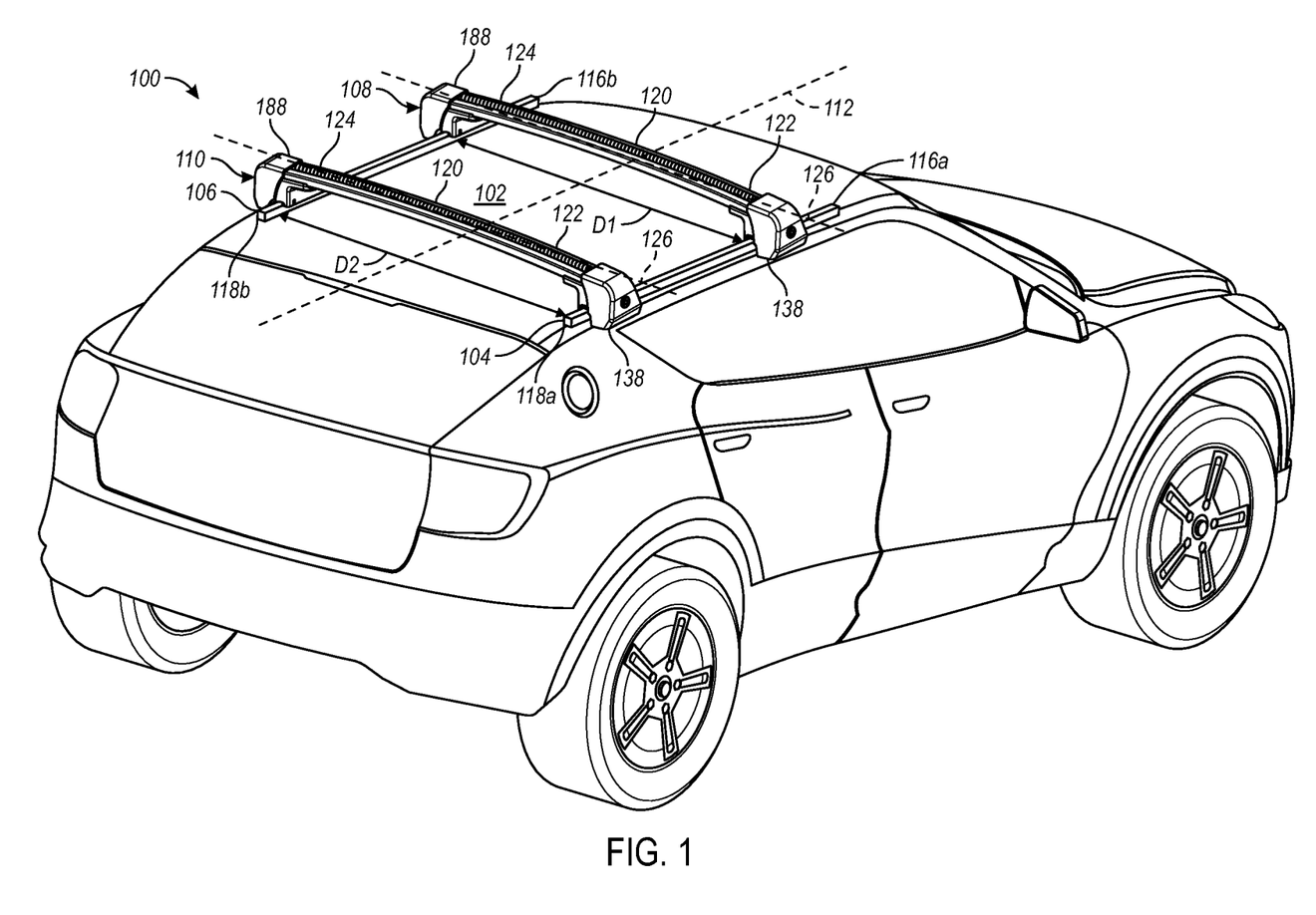
FIG. 1 is a perspective view of one example of a motor vehicle having a roof with two rails and two universal crossmember assemblies, illustrating each assembly having first and second clamp mechanisms attaching a crossbar to an associated one of the rails.
Figure 2:
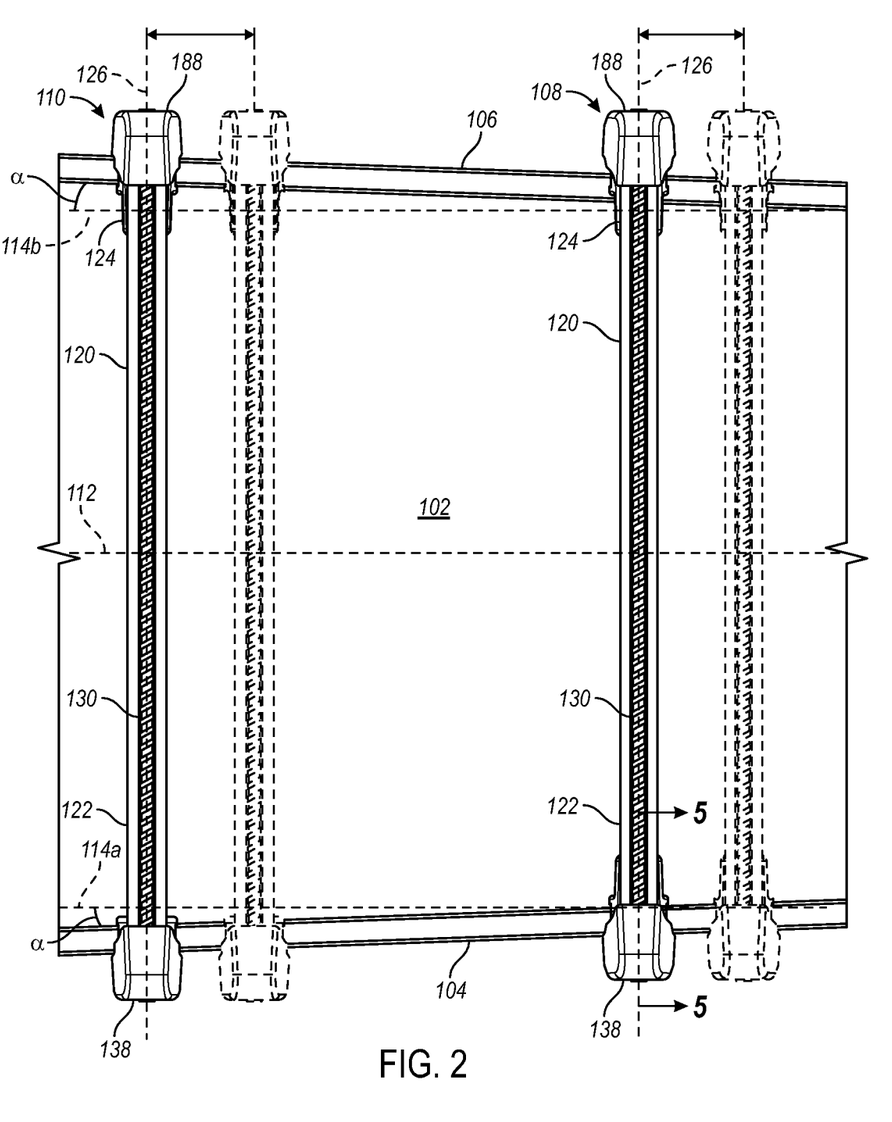
FIG. 2 is a top plan view of a portion of the roof of FIG. 1, illustrating each of the universal crossmember assemblies being displaceable along the rails.

The following description is merely exemplary in nature and is not intended to limit the present disclosure, application, or uses. Although the drawings represent examples, the drawings are not necessarily to scale and certain features may be exaggerated to better illustrate and explain a particular aspect of an illustrative example. Any one or more of these aspects can be used alone or in combination within one another. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows:

Referring to FIGS. 1 and 2, there is generally shown one example of a motor vehicle 100 having a roof 102 with first and second rails 104, 106 and two universal crossmember assemblies 108, 110 ("assemblies") engaging the first and second rails 104, 106. As described in detail below, each assembly 108, 110 has a robust construction that is displaceable along the rails (FIGS. 2 and 3), configured to attach to rails spaced from one another by a distance within a range of distances (FIGS. 1, 5, and 6), and configured to grip rails having a width within a range of widths (FIGS. 7-10). One non-limiting benefit of the robust construction of the assembly 108, 110 is that it is capable of being integrated within vehicles of different makes, models, and trims. While this example of the vehicle 100 includes two assemblies 108, 110 that are identical to one another, it is contemplated that the vehicle 100 can have assemblies that are different from one another.

Figure 3:
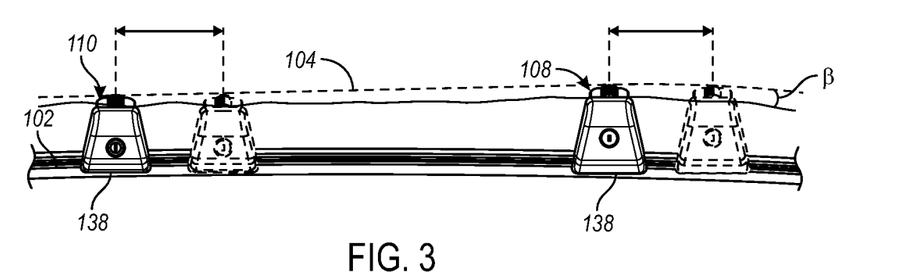
FIG. 3 is a side view of one of the rails of FIG. 2, illustrating a side profile of the roof and one of the rails having a downwardly curving slope.

Each of the first and second rails 104, 106 is disposed about a longitudinal centerline 112 of the vehicle 100. The first and second rails 104, 106 are angularly spaced a predetermined angle α (FIG. 2) relative to the longitudinal centerline 112 and reference lines 114a, 114b parallel to same. As shown in FIG. 1, the first and second rails 104, 106 have front ends 116a, 116b spaced from one another by a front end distance D1. The rear ends 118a, 118b spaced from one another by a rear end distance D2, which is shorter than the front end distance D1. It is contemplated that the rear ends of the rails can be spaced from one another by a distance, which is longer than the distance by which the front ends are spaced from one another. In still other examples, the rails can be linear or arranged parallel with one another. As shown in FIG. 3, the exemplary rails 104, 106 can follow the roof 102 and have a profile that curves vertically downward toward the front of the vehicle, such that positioning the assembly 108 toward the front ends 116a, 116b of the rails 104, 106 can dispose the assembly 108 at a position that is vertically lower than the other assembly 110. However, it is contemplated that the rails can be linear or have other suitable profiles.

Referring again to FIGS. 1 and 2, each assembly 108, 110 includes a crossbar 120 having first and second ends 122, 124 along an axis 126. In other examples, the vehicle can have more or fewer than two assemblies attached to the rails. The exemplary crossbar 120 is an extrusion (best shown in FIGS. 4-6) that defines an upper groove 128 for receiving a trim insert 130. The crossbar 120 further defines a lower groove 132 with a wall thickness 134 separating the upper and lower grooves 128, 132. At each of the first and second ends 122, 124 of the crossbar 120, the wall thickness 134 defines an elongated slot 136 (FIGS. 5 and 6) along the axis 126 of the crossbar 120. As described in detail below, the slots 136 are used for attaching the assemblies 108, 110 to rails 104, 106 that can be spaced from one another by any distance within a range of distances. While FIGS. 5-10 illustrate enlarged cross-sectional views of only the first end 122 of the crossbar 120, the first and second ends 122, 124 of the crossbar 120 are identical to one another.

Referring generally to FIGS. 4-10, each assembly 108 further includes a first clamp mechanism 138 engaged with the first end 122 of the crossbar 120 for securing the crossbar 120 to the first rail 104. The first clamp mechanism 138 includes at least first and second jaws 140, 142 having an associated one of first and second rail gripping surfaces 144, 146 (best shown in FIGS. 5 and 6). However, it is contemplated that the first clamp mechanism can have more or fewer than two jaws.

Figure 4:
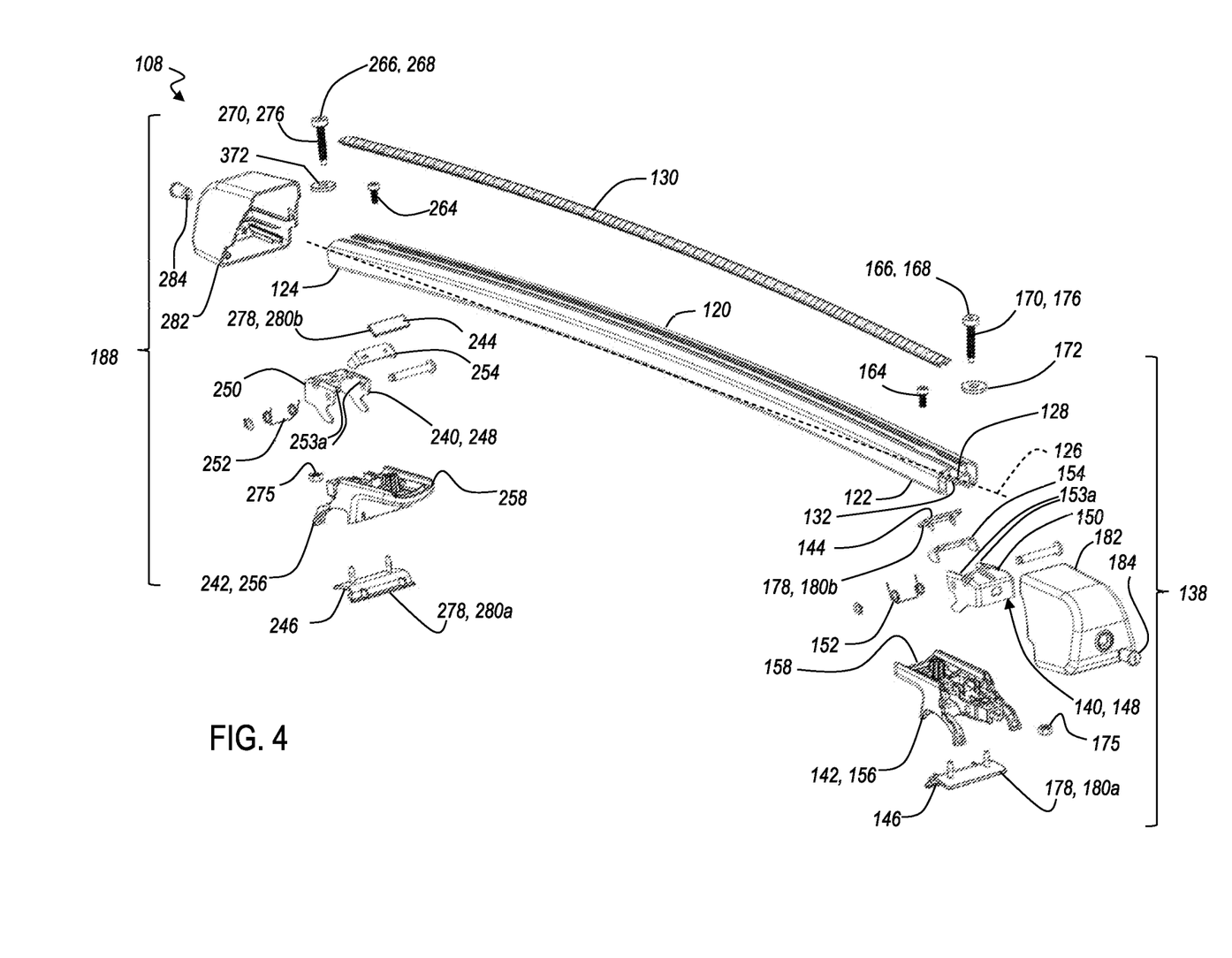
FIG. 4 is an exploded perspective view of one of the assemblies of FIG. 1.
Figure 8:
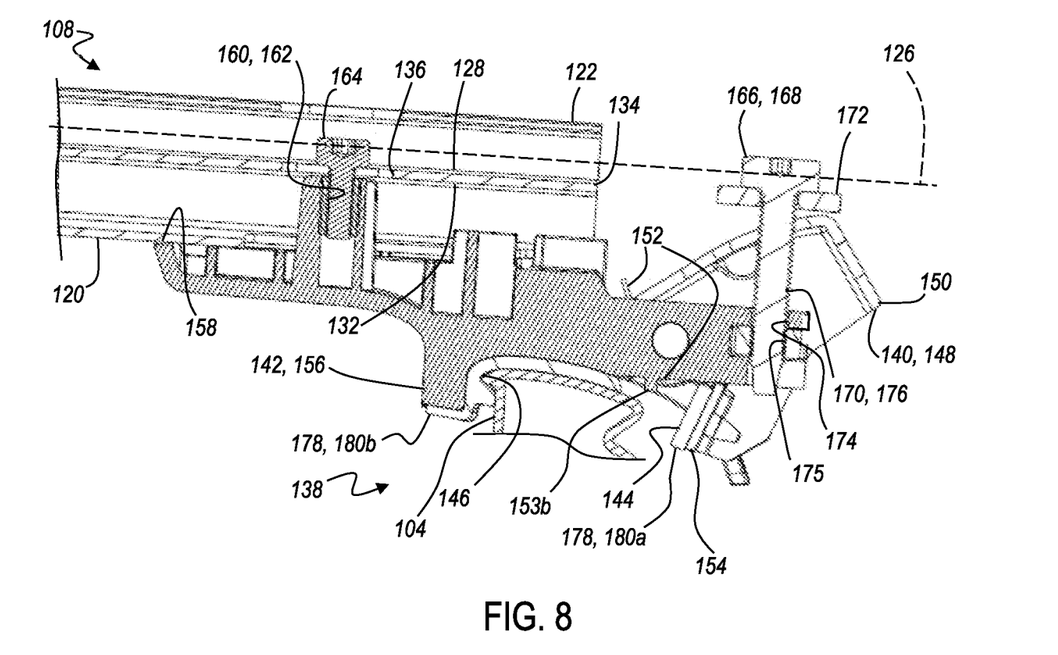
FIG. 8 is a cross-sectional view of the first clamp mechanism of FIG. 7 as taken along line 8-8.

As best shown in FIG. 4, the exemplary first jaw 140 is a bracket frame 148, and the bracket frame 148 includes a first bracket 150 pivotally attached to the second jaw 142. The biasing member 152 is coupled to the first bracket 150 for urging a free end of the first bracket 150 away from the second jaw 142 (FIG. 8). The bracket frame 148 further includes a second bracket 154 carried on the first bracket 150, with the second rail gripping surface 146 being carried by the second bracket 154.

Figure 5:
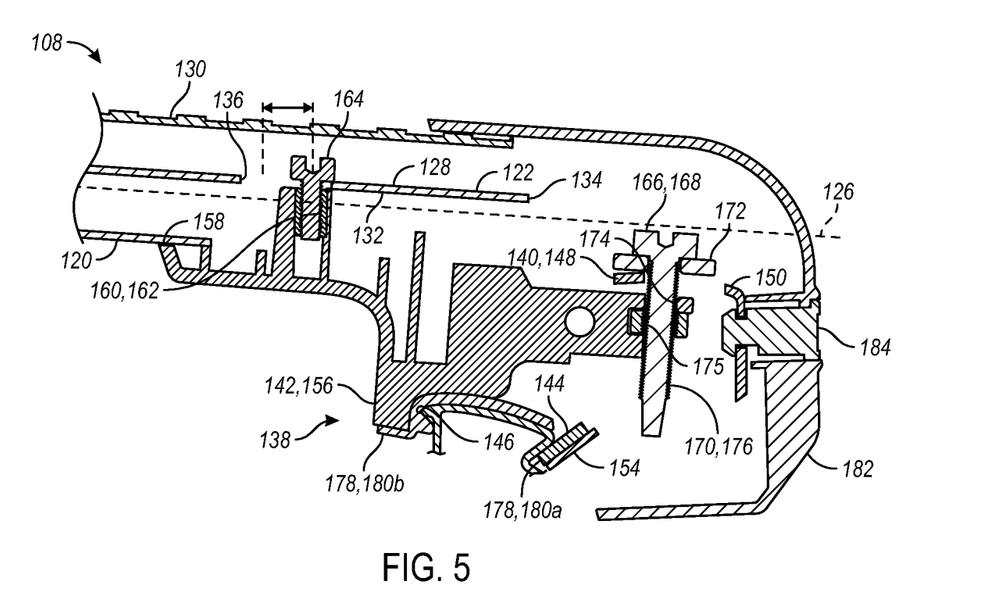
FIG. 5 is a cross-sectional view of the first clamp mechanism of FIG. 2 as taken along line 5-5, illustrating the first clamp mechanism moved to an outboard position on the crossbar.
Figure 6:
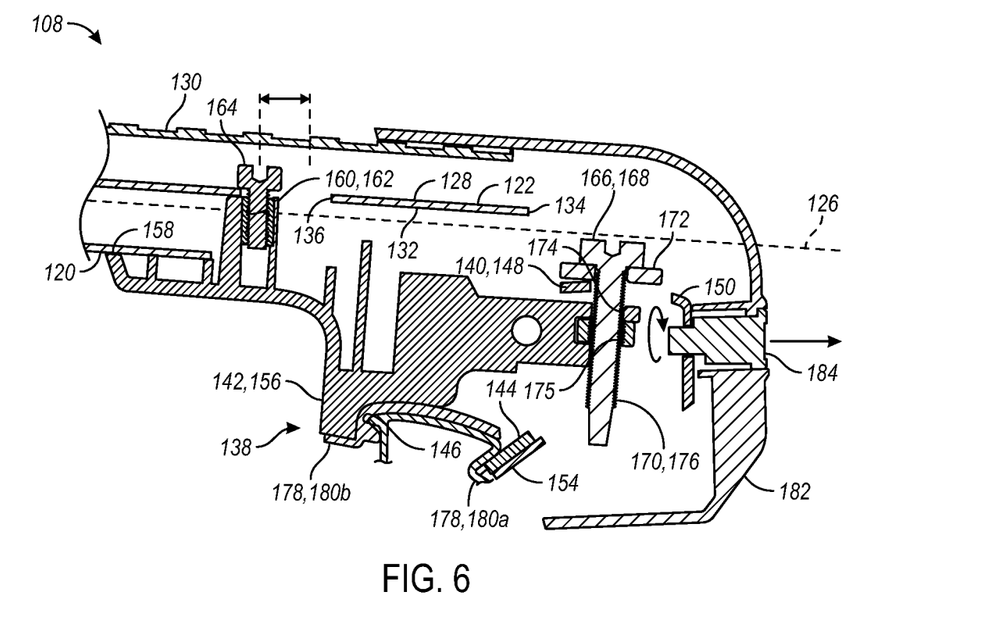
FIG. 6 is a cross-sectional view of the first clamp mechanism of FIG. 5, illustrating the first clamp mechanism moved to an inboard position on the crossbar.
Figure 7:
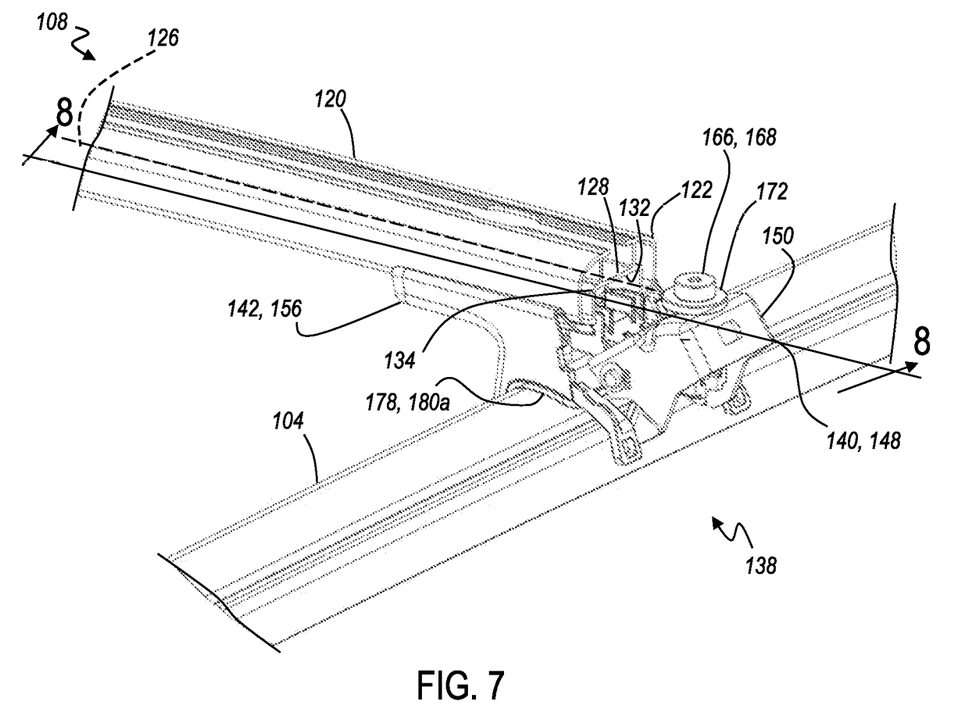
FIG. 7 is an enlarged perspective view of the first clamp mechanism of FIG. 1, with a cover removed to illustrate the first clamp mechanism having an actuator in a non-actuated position prior to attaching the crossbar to the rail.

Referring to FIGS. 5 and 6, the first clamp mechanism 138 is displaceable along the axis 126 of the crossbar 120, such that the crossbar 120 is capable of mounting to the first and second rails 104, 106 that are spaced from one another by any distance within the range of distances associated with the length of the crossbar 120 and the length of the elongated slots 136. The second jaw 142 includes a stanchion 156 defining a seat 158 for supporting the crossbar 120, and the stanchion 156 is displaceable along the axis 126 of the crossbar 120. The stanchion 156 defines a hole 160 with an internal threading 162, such that the elongated slot 136 of the crossbar 120 and the hole 160 of the stanchion 156 are capable of receiving a threaded fastener 164 for holding the stanchion 156 at a fixed position along the axis 126 of the crossbar 120 between an outboard position (FIG. 5) and an inboard position (FIG. 6). In this example, the internal threading is formed on a metal sleeve that attached to the stanchion. However, it is contemplated that the internal threading can be formed on a separate nut fastener or integrally formed on a portion of the stanchion.

Figure 9:
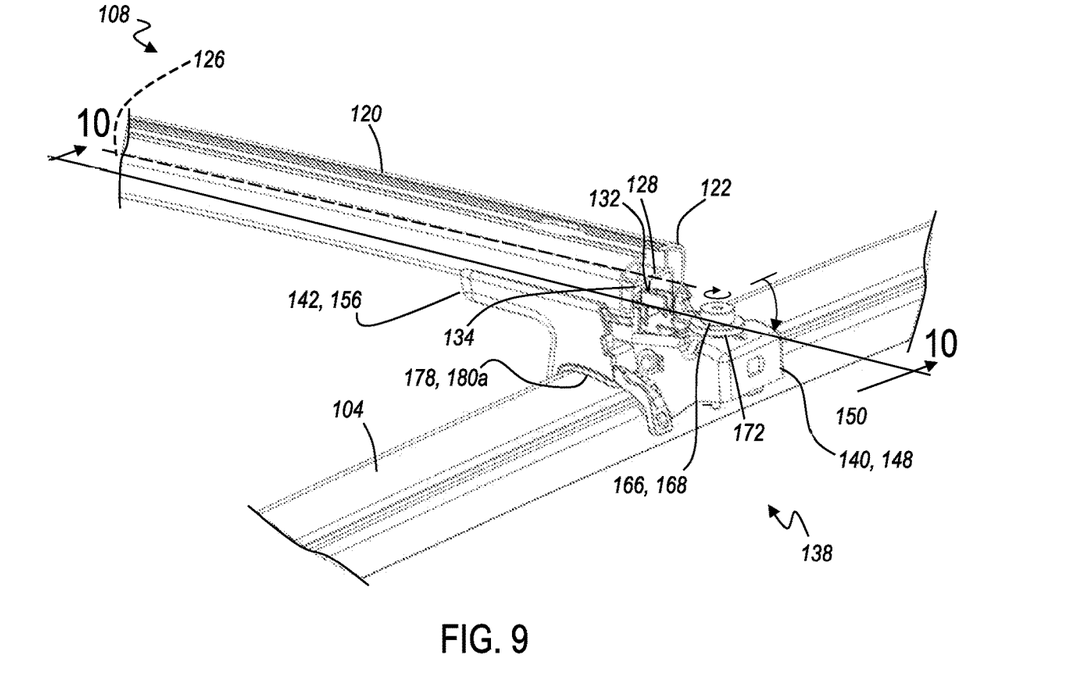
FIG. 9 is an enlarged perspective view of the first clamp mechanism of FIG. 1, with the cover removed to illustrate the actuator moved to the actuated position for attaching the crossbar to the rail.
Figure 10:
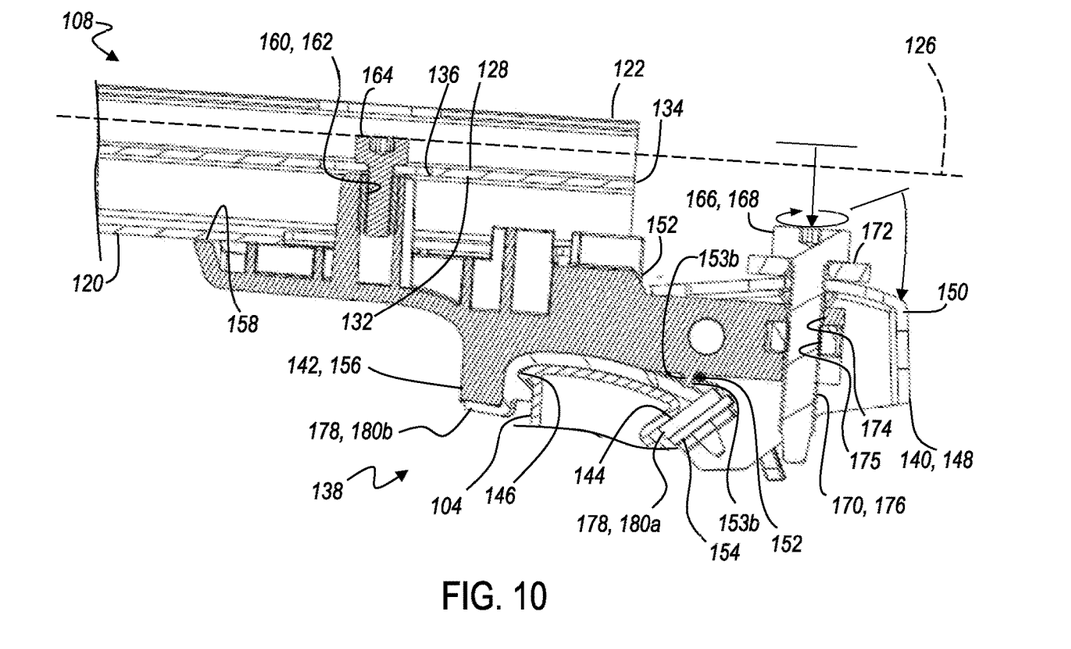
FIG. 10 is a cross-sectional view of the first clamp mechanism of FIG. 9 as taken along line 10-10.

Referring to FIGS. 7-10, the first clamp mechanism 138 further includes an actuator 166 engaged with the first and second jaws 140, 142 and movable between a non-actuated position (FIGS. 7 and 8) and an actuated position (FIGS. 9 and 10). The first and second rail gripping surfaces 144, 146 of the first clamp mechanism 138 are capable of moving toward one another to grip the first rail 104 of any width therebetween when the associated actuator 166 is disposed in the actuated position (FIGS. 9 and 10). In this example, the actuator 166 includes a bolt member 168 having an external threading 170 and driven by hand or a handheld tool. The actuator 166 further includes a drive collar 172 extending from the bolt member 168. At least one of the first and second jaws 140, 142 defines an opening 174 with internal threading 175 for engaging the external threading 170 of the bolt member 168, such that rotating the bolt member 168 engages the drive collar 172 with the first jaw or the second jaw 140, 142 and moves the first and second jaws 140, 142 toward one another. In this example, the internal threading 175 is formed on a nut that is carried on the second jaw 140, by for example placing the nut into the stanchion in its free state. However, in other examples, the nut may be insert molded into the stanchion. Also, in this example, the drive collar 172 is a threaded washer or nut separate from the shaft 176 of the bolt member 168 and displaceable along the shaft 176. It is contemplated that the internal threading can be machined or otherwise integrally formed in the second jaw itself, and the internal threading can formed in the first jaw.

The first clamp mechanism 138 further includes a biasing mechanism 152 coupled to at least one of the first and second jaws 140, 142. The biasing mechanism 152 is capable of urging the first jaw 140 away from the second jaw 142. The first and second rail gripping surfaces 144, 146 of the first clamp mechanism 138 are capable of being moved away from one another by the biasing mechanism 152 when the actuator 166 is disposed in the non-actuated position. In this example, the biasing member 152 is a torsion spring (FIG. 4) with opposing ends engaging associated tabs 153a of the first jaw 140 and a middle section, which interconnects the opposing ends and engages the second jaw 142 (FIG. 8) for urging the jaws away from one another. However, each clamp mechanism can have any suitable biasing member for urging the jaws away from one another.

As best shown in FIG. 10, the first clamp mechanism 138 further includes one or more modular pads 178 attached to at least one of the first and second jaws 140, 142. Each modular pad has a thickness within a range of thicknesses and a profile within a range of profiles, such that the modular pad cooperates with the first and second jaws 140, 142 for gripping the first and second rails 104, 106 each having one of the range of widths and one of a range of shapes. In this example, the assembly includes a first modular pad 180a attached to the first jaw 140 and defining the first rail gripping surface 144 and a second modular pad 180b coupled to the second bracket 154 of the second jaw 142. However, it is contemplated that the assembly may have only one modular pad attached to the second jaw or not have any modular pads.

The first clamp mechanism 138 further includes a cover 182 for covering the actuator 166 and a locking mechanism 184 mounted to the cover 182. The locking mechanism 184 is disposable between a locked state (FIG. 5) where the locking mechanism 184, such as a cam, attaches the cover 182 to the first jaw 140 or the crossbar 120 and an unlocked state (FIG. 6) where the cover 182 is removable from the first jaw 140 and the crossbar 120. The first clamp mechanism 138 further includes a key 186 for moving the locking mechanism 184 between the unlocked and locked states.

As generally shown in FIGS. 1-3, the assembly 108 further includes a second clamp mechanism 188 engaged with the second end 124 of the crossbar 120 for securing the crossbar 120 to the second rail 106. While FIGS. 5-10 illustrate multiple views of only the first clamp mechanism 138 attached to the first end 122 of the crossbar 120, the second clamp mechanism 188 and second end 124 of the crossbar 120 are identical to the first clamp mechanism 138 and the first end 122 of the crossbar 120. The second clamp mechanism 188 and the second end 124 of the crossbar 120 have the same components identified by the same numbers increased by 100.

Figure 11:
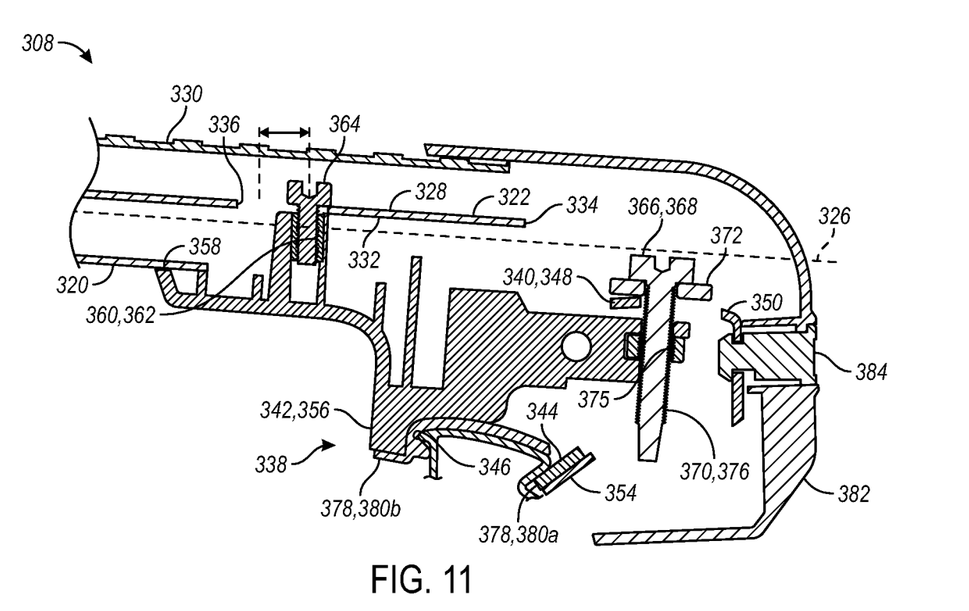
FIG. 11 is a cross-sectional view of another example of a first clamp mechanism of FIG. 1, illustrating the first clamp mechanism having an actuator in the form of a bolt member with a drive collar that is an integral portion of the bolt member.

Referring to FIG. 11, another example of an actuator 366 is similar to the actuator 166 of FIG. 5, and includes similar components identified by the same numbers increased by 200. However, while the drive collar 172 of FIG. 5 is separate from the shaft 176 of the bolt member 168 and displaceable along the shaft 176, the drive collar 372 is an integral portion of the shaft 376 and disposed at a fixed position along the shaft 376.

Figure 12:
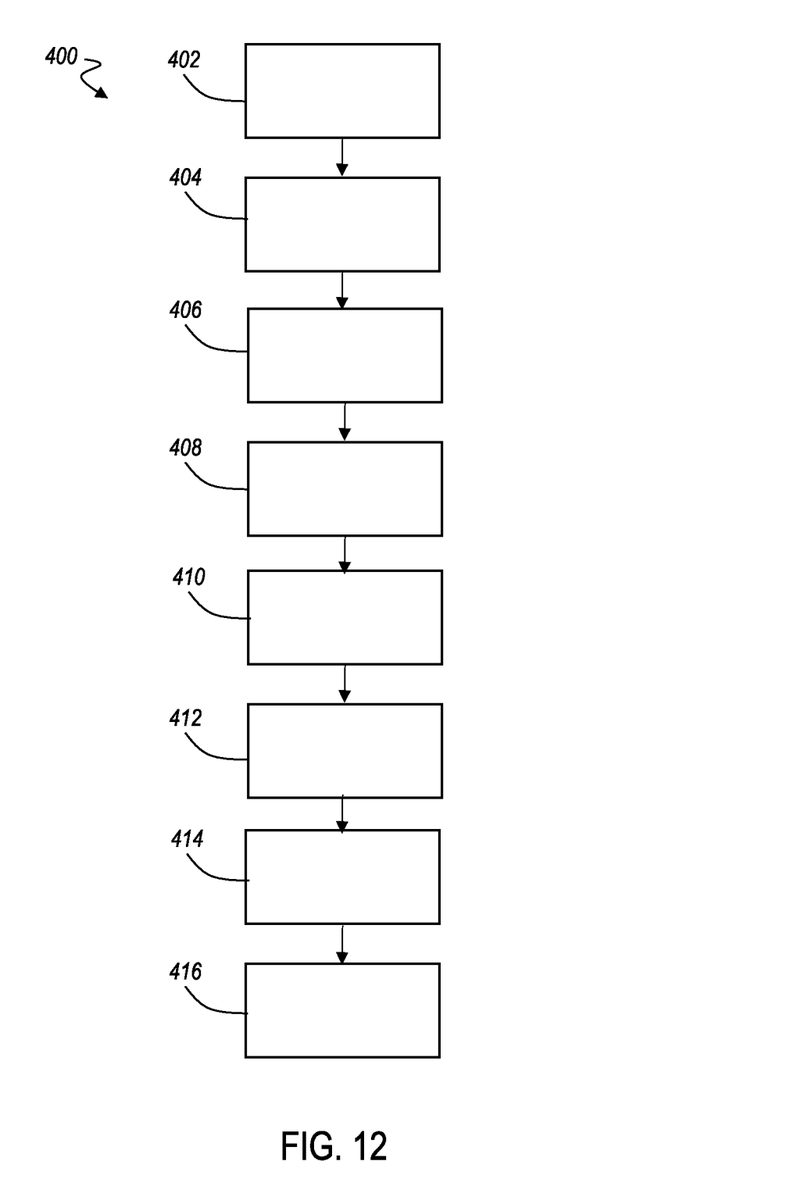
FIG. 12 is a flow chart of one example of a method for operating the assembly of FIG. 1.

Referring to FIG. 12, a flow chart for a method 400 of operating the universal crossmember assembly 108 of FIG. 1 is provided. The method begins at block 402 with the crossbar 120 being displaced on the first and second rails 104, 106 to a position that is at a predetermined distance from another assembly. For instance, this distance can be associated with the length of cargo to be supported by the assemblies.

At block 404, the drive collar 172 can be displaced along the bolt member 168, and one or more modular pads of a predetermined thickness and shape can be attached to the jaws. The drive collar and the pads cooperate with the pivoting action of the jaws for gripping rails of various widths and shapes.

At block 406, the actuator 166 of each of the first and second clamp mechanisms 138, 188 is moved from the non-actuated position (FIGS. 7 and 8) to the actuated position (FIGS. 9 and 10). The first and second rail gripping surfaces 144, 146 of the associated first and second clamp mechanisms 138, 188 grip the first and second rails 104, 106, in response to the actuator being moved to the actuated position. More specifically, in the first clamp mechanism 138, the first rail gripping surface 144 on the first modular pad 180a and the second rail gripping surface 146 on the second jaw 142 grip the first rail 104. In the second clamp mechanism 188, the first rail gripping surface 144 on the first modular pad 180a and the second rail gripping surface 146 on the second jaw 142 grip the second rail 106.

At block 408, the cover 182 of the first clamp mechanism 138 is attached to the first jaw 140 to cover the actuator 166 of the first clamp mechanism 138, and the cover 182 of the second clamp mechanism 188 is attached to the first jaw 140 to cover the actuator 166 of the second clamp mechanism 188.

At block 410, the key 186 moves the locking mechanism 184 of an associated one of the first and second clamp mechanisms 138, 188' between the unlocked state and the locked state.

At block 412, the cover 182 is removed from the crossbar 120, in response to the locking mechanism 184 being disposed in the unlocked state.

At block 414, the cover 182 is secured to the crossbar 120, in response to the locking mechanism 184 being disposed in the locked state.

At block 416, the biasing mechanism 152 urges at least the first jaw 140 away from the second jaw 142, in response to the actuator 166 being disposed in the non-actuated position. With the first jaw moved away from the second jaw, the assembly can be displaced along the rails or be removed entirely from the vehicle.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:
1. A universal crossmember assembly for a motor vehicle having a roof with first and second rails attached to the roof, and each of the first and second rails having one of a range of widths and spaced from one another by one of a range of distances, the universal crossmember assembly comprising:
 a crossbar having first and second ends along an axis;
 a first clamp mechanism engaged with the first end of the crossbar for securing the crossbar to the first rail; and
 a second clamp mechanism engaged with the second end of the crossbar for securing the crossbar to the second rail;
 wherein each of the first and second clamp mechanisms comprises:
  at least first and second jaws having an associated one of first and second rail gripping surfaces;
  an actuator engaged with at least one of the first and second jaws and movable between a non-actuated position and an actuated position; and
  a biasing mechanism coupled to at least one of the first and second jaws and capable of urging the first jaw away from the second jaw;
 wherein the first and second rail gripping surfaces of the first clamp mechanism are capable of moving toward one another to grip the first rail of one of the range of widths in response to the associated actuator being disposed in the actuated position, and the first and second rail gripping surfaces of the first clamp mechanism are capable of being urged away from one another by the associated biasing mechanism in response to the associated actuator being disposed in the non-actuated position;
 wherein the first and second rail gripping surfaces of the second clamp mechanism are capable of moving toward one another to grip the second rail of one of the range of widths in response to the associated actuator being disposed in the actuated position, and the first and second rail gripping surfaces of the second clamp mechanism are capable of being urged away from one another by the associated biasing mechanism in response to the associated actuator being disposed in the non-actuated position.

2. The universal crossmember assembly of claim 1 further comprising at least one modular pad attached to at least one of the first and second jaws, with the at least one modular pad comprising at least one of the first and second rail gripping surfaces and having one of a range of thicknesses that cooperates with the first and second jaws for gripping one of the range of widths of the first and second rails therebetween.

3. The universal crossmember assembly of claim 2 wherein the actuator comprises:
 a bolt member having an external threading; and
 a drive collar extending from the bolt member, with the drive collar engaging one of the first and second jaws to move the first and second jaws toward one another.

4. The universal crossmember assembly of claim 3 wherein at least one of the first and second jaws defines an opening with an internal threading for engaging the external threading of the bolt member such that rotating the bolt member causes the drive collar to engage one of the first and second jaws for driving the first and second jaws toward one another.

5. The universal crossmember assembly of claim 4 wherein the bolt member has a shaft, and the drive collar is an integral portion of the bolt member and disposed in a fixed position on the shaft of the bolt member.

6. The universal crossmember assembly of claim 4 wherein the bolt member has a shaft, and the drive collar is separate from the shaft and displaceable along the shaft of the bolt member.

7. The universal crossmember assembly of claim 4 wherein the first jaw comprises a bracket frame, and the bracket frame comprises:
 a first bracket pivotally attached to the second jaw, with the biasing member coupled to the first bracket for urging a free end of the first bracket away from the second jaw; and
 a second bracket carried on the first bracket, with the at least one modular pad being coupled to the second bracket.

8. A universal crossmember assembly for a motor vehicle having a roof with first and second rails attached to the roof, and each of the first and second rails having one of a range of widths and spaced from one another by one of a range of distances, the universal crossmember assembly comprising:
 a crossbar having first and second ends along an axis;
 a first clamp mechanism engaged with the first end of the crossbar for securing the crossbar to the first rail; and
 a second clamp mechanism engaged with the second end of the crossbar for securing the crossbar to the second rail;
 wherein each of the first and second clamp mechanisms comprises:
  at least first and second jaws having an associated one of first and second rail gripping surfaces;
  an actuator engaged with at least one of the first and second jaws and movable between a non-actuated position and an actuated position; and
  a biasing mechanism coupled to at least one of the first and second jaws and capable of urging the first jaw away from the second jaw;
 wherein the first and second rail gripping surfaces of the first clamp mechanism are capable of moving toward one another to grip the first rail of one of the range of widths in response to the associated actuator being disposed in the actuated position, and the first and second rail gripping surfaces of the first clamp mechanism are capable of moving away from one another by the biasing mechanism of the first clamp mechanism in response to the associated actuator being disposed in the non-actuated position;
 wherein the first and second rail gripping surfaces of the second clamp mechanism are capable of moving toward one another to grip the second rail of one of the range of widths in response to the associated actuator being disposed in the actuated position, and the first and second rail gripping surfaces of the second clamp mechanism are capable of moving away from one another by the biasing mechanism of the second clamp mechanism in response to the associated actuator being disposed in the non-actuated position;
 wherein at least one of the first and second clamp mechanisms is displaceable along the axis of the crossbar, such that the crossbar is capable of mounting to the first and second rails that are spaced from one another by one of the range of distances.

9. The universal crossmember assembly of claim 8 further comprising at least one modular pad attached to at least one of the first and second jaws, with the at least one modular pad comprising at least one of the first and second rail gripping surfaces and having one of a range of thicknesses that cooperates with the first and second jaws for gripping one of the range of widths of the first and second rails therebetween.

10. The universal crossmember assembly of claim 9 wherein the second jaw of each of the first and second clamp mechanisms comprises a stanchion that defines a seat for supporting the crossbar, and the stanchion is displaceable along the axis of the crossbar.

11. The universal crossmember assembly of claim 10 wherein the crossbar defines an elongated slot along the axis, and the stanchion defines a hole with an internal threading, such that the elongated slot of the crossbar and the hole of the stanchion are capable of receiving a threaded fastener for holding the stanchion at a fixed position along the axis of the crossbar.

12. The universal crossmember assembly of claim 11 wherein each of the first and second clamp mechanisms further comprises:
  a cover for covering the actuator;
  a locking mechanism mounted to the cover, with the locking mechanism disposable between a locked state where the cover is attached to one of the first jaw and the crossbar and an unlocked state where the cover is removable from the first jaw and the crossbar; and
  a key for moving the locking mechanism between the unlocked and locked states.

13. The universal crossmember assembly of claim 12 wherein the actuator comprises:
  a bolt member having an external threading; and
  a drive collar extending from the bolt member;
  wherein at least one of the first and second jaws defines an opening with an internal threading for engaging the external threading of the bolt member such that rotating the bolt member causes the drive collar to engage one of the first and second jaws for driving the first and second jaws toward one another.

14. The universal crossmember assembly of claim 13 wherein the bolt member has a shaft, and the drive collar is an integral portion of the bolt member and disposed in a fixed position on the shaft of the bolt member.

15. The universal crossmember assembly of claim 13 wherein the bolt member has a shaft, and the drive collar is separate from the shaft and displaceable along the shaft of the bolt member.

16. A method of operating a universal crossmember assembly for a motor vehicle having a roof with first and second rails attached to the roof, each of the first and second rails have one of a range of widths, with the first and second rails spaced from one another by one of a range of distances, and the universal crossmember assembly includes a crossbar and first and second clamp mechanisms, with each of the first and second clamp mechanisms having at least first and second jaws with associated first and second rail gripping surfaces, an actuator, and a biasing mechanism, the method comprising:
  positioning the crossbar at a predetermined location relative to the first and second rails;
  moving the actuator of each of the first and second clamp mechanisms from a non-actuated position to an actuated position;
  moving, for each of the first and second clamp mechanisms, the first rail gripping surface of the first jaw toward the second rail gripping surface of the second jaw in response to the actuator being disposed in the actuated position;
  gripping, using the first and second rail gripping surfaces of the first clamp mechanism, the first rail;
  gripping, using the first and second rail gripping surfaces of the second clamp mechanism, the second rail;
  urging, using the biasing mechanism of the first clamp mechanism, at least the first jaw away from the second jaw in response to the actuator of the first clamp mechanism being disposed in the non-actuated position; and
  urging, using the biasing mechanism of the second clamp mechanism, at least the first jaw away from the second jaw in response to the actuator of the second clamp mechanism being disposed in the non-actuated position.

17. The method of claim 16 further comprising gripping, using at least one modular pad having one of a range of thicknesses, at least one of the first and second rails having one of the range of widths.

18. The method of claim 17 further comprising displacing at least one of first and second clamp mechanisms along an axis of the crossbar such that the first and second clamp mechanisms are spaced from one another by a distance that the first and second rails are spaced from one another.

19. The method of claim 18 further comprising:
  displacing a drive collar along a bolt member of the associated actuator;
  gripping, using the first and second gripping surfaces of the first clamp mechanism, the first rail having one of the range of widths, at least in response to displacing the drive collar for the first clamp mechanism along the bolt member; and
  gripping, using the first and second gripping surfaces of the second clamp mechanism, the second rail having one of the range of widths, at least in response to displacing the drive collar for the second clamp mechanism along the bolt member.

20. The method of claim 19 further comprising:
  covering the actuator of the first clamp mechanism by attaching a cover of the first clamp mechanism to one of the crossbar and the first jaw;
  covering the actuator of the second clamp mechanism by attaching a cover of the second clamp mechanism to one of the crossbar and the second jaw;
  moving, using a key, a locking mechanism of an associated one of the first and second clamp mechanisms between an unlocked state and a locked state;
  removing the cover from at least one of the first and second clamp mechanisms in response to the locking mechanism being disposed in the unlocked state; and
  securing the cover to at least one of the first and second clamp mechanisms in response to the locking mechanism being disposed in the locked state.

* * * * *